United States Patent [19]

Raney, Jr.

[11] 4,241,340

[45] Dec. 23, 1980

[54] APPARATUS FOR GENERATING DISPLAYS OF VARIABLE SIZE CHARACTERS

[75] Inventor: Meredith T. Raney, Jr., Melbourne, Fla.

[73] Assignee: Harris Corporation, Cleveland, Ohio

[21] Appl. No.: 909,797

[22] Filed: May 26, 1978

[51] Int. Cl.[3] .................... G06F 3/14

[52] U.S. Cl. .................... 340/731; 178/15; 178/30; 340/744; 340/750

[58] Field of Search .................... 178/15, 30; 340/728, 340/731, 744, 750

[56] References Cited

U.S. PATENT DOCUMENTS

| | | | |
|---|---|---|---|
| 3,553,676 | 1/1971 | Raciti | 340/744 |
| 3,568,178 | 3/1971 | Day | 178/15 |
| 3,659,283 | 4/1972 | Ophir | 340/731 |
| 3,893,100 | 7/1975 | Stein | 340/731 |
| 4,078,249 | 3/1978 | Lelke et al. | 340/731 |
| 4,079,367 | 3/1978 | Yonezawa et al. | 340/728 |
| 4,090,188 | 5/1978 | Suga | 340/731 |
| 4,107,665 | 8/1978 | Mayer et al. | 340/731 |

*Primary Examiner*—Marshall M. Curtis

[57] ABSTRACT

A character display system is disclosed which provides displays of characters of variable size. A diddle raster scanning technique is used to display each character in its entirely before proceeding with the display of the next character. The size of the character is increased by increasing the size of the diddle raster scanned. In order to improve the appearance of larger point size characters, each character stroke is repeated a number of times N, where N increases with increasing point size.

A circuit (112) provides an indication of the size of the character to be displayed. This indication is used to address a ROM (146) which contains control information (D1-D5) therein. A portion (D2, D3, D5) of this information controls the size of the diddle raster scanned, and another portion (D1) provides the number N indicating the number of times each character stroke is to be repeated. A video generator (114) generates a video signal on the basis of this number N and various character codes supplied to it. A third portion (D4) of the control information sets the intensity of the video signal in accordance with point size so that characters of different sizes have the same apparent brightness.

8 Claims, 11 Drawing Figures

VIDEO GENERATOR 114

RAMP GENERATOR 132

DISPLAY GENERATOR 66

DIDDLE CLOCK GENERATOR 142

APPARATUS FOR GENERATING DISPLAYS OF VARIABLE SIZE CHARACTERS

BACKGROUND AND FIELD OF THE INVENTION

The present invention relates to image display systems, and more particularly to a system for displacing characters by a diddle raster scanning technique wherein the size of the characters being displayed may be varied.

Several techniques are currently in use to display characters on the screen of a cathode ray tube (CRT). One approach utilizes conventional television raster scanning techniques to scan the entire face of the CRT, line by line, from the top to the bottom. This technique is widely used and has a number of inherent advantages. Certain applications, however, require that the size of the text being displayed on the face of the screen be of variable size. In ad layout systems and certain photocomposition systems, for example, different portions of the displayed text must be of different point sizes. This is not easily accomplished in a conventional raster scanning system, however.

A second technique, sometimes referred to as diddle raster scanning, has been used in these applications. In this technique the display is generated on the screen by scanning one full character at a time. In other words, the electron beam is moved to a particular position on the screen, and then a single character field is raster scanned at that positions so as to display an entire character. The electron beam then proceeds to display, or "paint", the next character, and then the next, and so on until all of the characters have been painted on the screen. When this technique is used, the size of the character may be changed by the simple expedient of varying the size of the minor raster which is scanned by the electron beam. This increases the size of the character field, and results in a corresponding increase in the size of the character being displayed.

The system described in Frederickson et al., U.S. Pat. No. 3,872,460, is an example of a system employing this latter technique. It was found, however, that the extent to which a character could be increased in size by this technique was limited. As the size of the character increased, the individual display strokes which made up the character moved somewhat further apart. Since the electron beam maintained a constant cross section as the size of the character was varied, this increase in the separation between the strokes of the characters resulted in the larger point size characters having a quite disjointed appearance.

SUMMARY OF THE INVENTION

It has been found that the disjointed appearance of large scale characters can be avoided by repeating the display of each stroke of a particular character. That is, for characters up to a given point size, each stroke is displayed only once. For characters above that size and below a second size, each stroke of the character is used to generate two adjacent display strokes. For characters having sizes beyond the second limit, each stroke of the character is repeated three times. This has the effect of increasing the apparent thickness of each portion of the character being displayed. The characters therefore appear more unified than in the past. This improves the appearance of the display, while increasing its readibility. Also, this technique is quite easily implemented, and requires the addition of little circuitry beyond that which has been utilized in the past.

It is therefore an object of the present invention to provide a character display system which is capable of providing characters over a broad range of point sizes without varying the apparent quality of the character being displayed.

It is also an object of the present invention to provide a character display system which accomplishes the display of characters of varying sizes without requiring the inclusion of additional character memory.

It is yet another object of the present invention to provide a specific system for implementing the foregoing objects which is relatively inexpensive, and adds little complexity to the system.

A system is therefore disclosed for displaying at least one image of variable size on an energy responsive surface. This system includes display circuitry for causing an energy beam to raster scan at least a selected area of a display surface by scanning a plurality of adjacent display strokes in order to display at least one image on the display surface. A circuit is included for providing information for generating the strokes of the image to be displayed. Another circuit supplies an indication of the size of the image which is to be displayed. A deflection control circuit varies the size of the raster scanned by the energy beam in accordance with the indication of the size of the image to be displayed.

In accordance with the present invention, this system includes a circuit for causing the display circuitry to repeat the display of each stroke of the image in a selected number of adjacent display strokes, in accordance with the indication of the size of the image to be displayed. The system is therefore capable of providing display of images of varying size without degenerating the quality of the image thus displayed.

BRIEF DESCRIPTION OF THE DRAWINGS

The foregoing and other objects and advantages of the present invention will become more readily apparent from the following description of a preferred embodiment, as taken in conjunction with the accompanying drawings, wherein.

DETAILED DESCRIPTION

Figure 1:
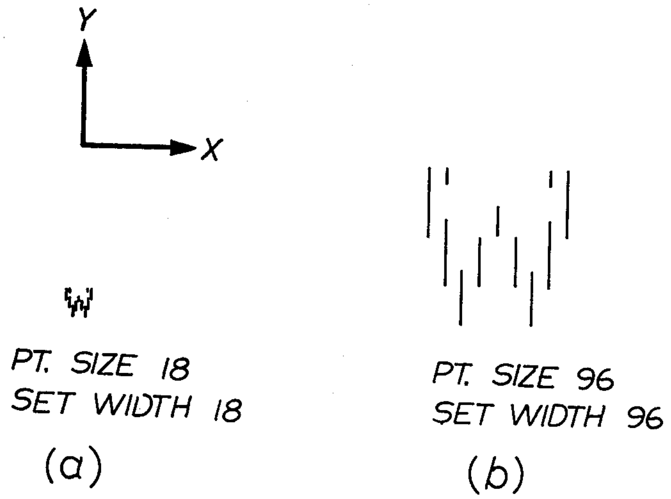
FIG. 1 is a representation of characters of different point sizes, as they would appear if displayed in accordance with prior art techniques.

FIG. 1 illustrates several characters as they would appear if displayed utilizing the minor, or "diddle" raster scanning techniques used in the aforementioned patent to Frederickson. The display of these characters would be carried out by causing the electron beam to scan back and forth over the character field in the Y direction, while causing the X position of the electron beam to less rapidly vary from the extreme left of the character field to the extreme right of the character field. The ratio of the speeds at which the X and Y scanning takes place would be such that ten vertical strokes would be completed during the interval in which the electron beam traverses from the left boundary of the character field to the right boundary of the character field.

During this scanning the character is painted on the screen by modulating the intensity input into the cathode ray tube. The time interval necessary for the electron beam to complete one vertical display stroke is broken up into twelve time segments, commonly known as pixels, and the intensity of the electron beam is selected to be either "on", or "off" during each of these time segments. The entire character is thus defined by a matrix having a height of twelve pixels and a width of ten strokes.

FIG. 1(*a*) is an illustration of the character "W" having a point size (height) of 18 and a set width (width) also of 18. This character has a unified, complete appearance due to the finite cross section of the electron beam. FIG. 1(*b*) represents the same character, as it would appear if displayed at a larger point size by simply varying the size of the diddle raster being scanned by the electron beam. In FIG. 1(*b*), the size of the character has been expanded to have a point size and set width of 96. The cross section of the electron beam, of course, will not vary as the size of the diddle raster is increased to increase the size of the character. Because of this, the character shown in FIG. 1(*b*) has a highly disjointed appearance.

Figure 2:
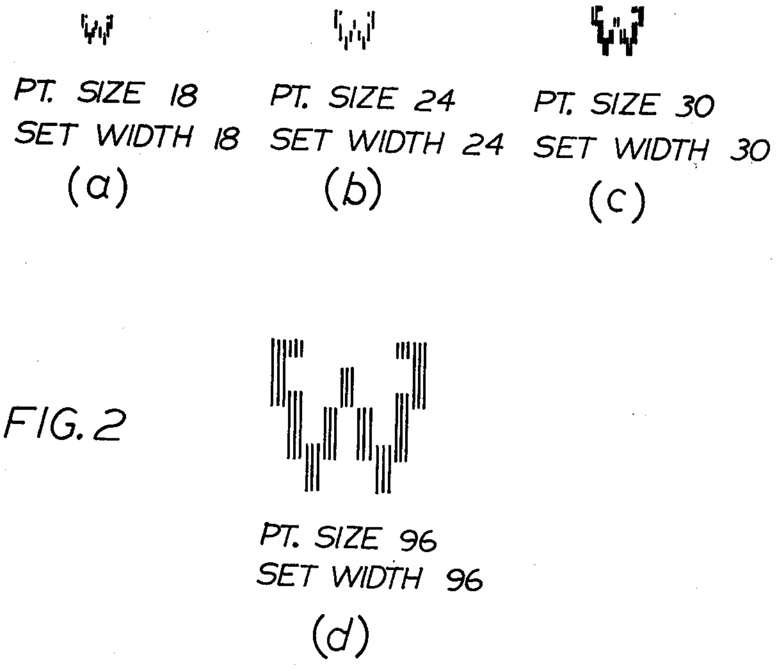
FIG. 2 is a representation of characters, also of varying point sizes, as displayed in accordance with the techniques of the present invention.

FIG. 2 includes four different point size representations of the character W, and illustrates the manner in which the present invention corrects for the increasing size of the character by repeating the display of each stroke in the character. For characters having point sizes up to and including point size 24 (FIGS. 2(*a*) and 2(*b*)) each stroke of the character is displayed but once (N=1). For point sizes from point size 24 to point size 48, each character stroke will be repeated so as to generate two display strokes (N=2) (FIG. 2(*c*)). For character sizes greater than point size 48, each stroke will be repeated three times (N=3). In each case, the rate of X scanning is adjusted so that the character will be displayed in the same size character field as it would have been if each character stroke were repeated only once. Thus, when N=2 the X scanning rate must be divided in half, and when N=3 it must be divided by three.

As can be seen from FIGS. 2(*c*) and 2(*d*), the net result of this is to increase the apparent thickness of each portion of the displayed character, and to effectively remove the disjointed appearance which had existed in the prior art.

It will also be noted, however, that a transition in the apparent brightness of the characters being displayed occurs when the number of times each stroke is to be repeated is changed. In other words a character of point size 24 provides a somewhat lighter appearance than a character of point size 30. This apparent difference in brightness between characters of differing point sizes can be compensated for by setting the intensity of the electron beam differently for different character sizes.

Figure 3:
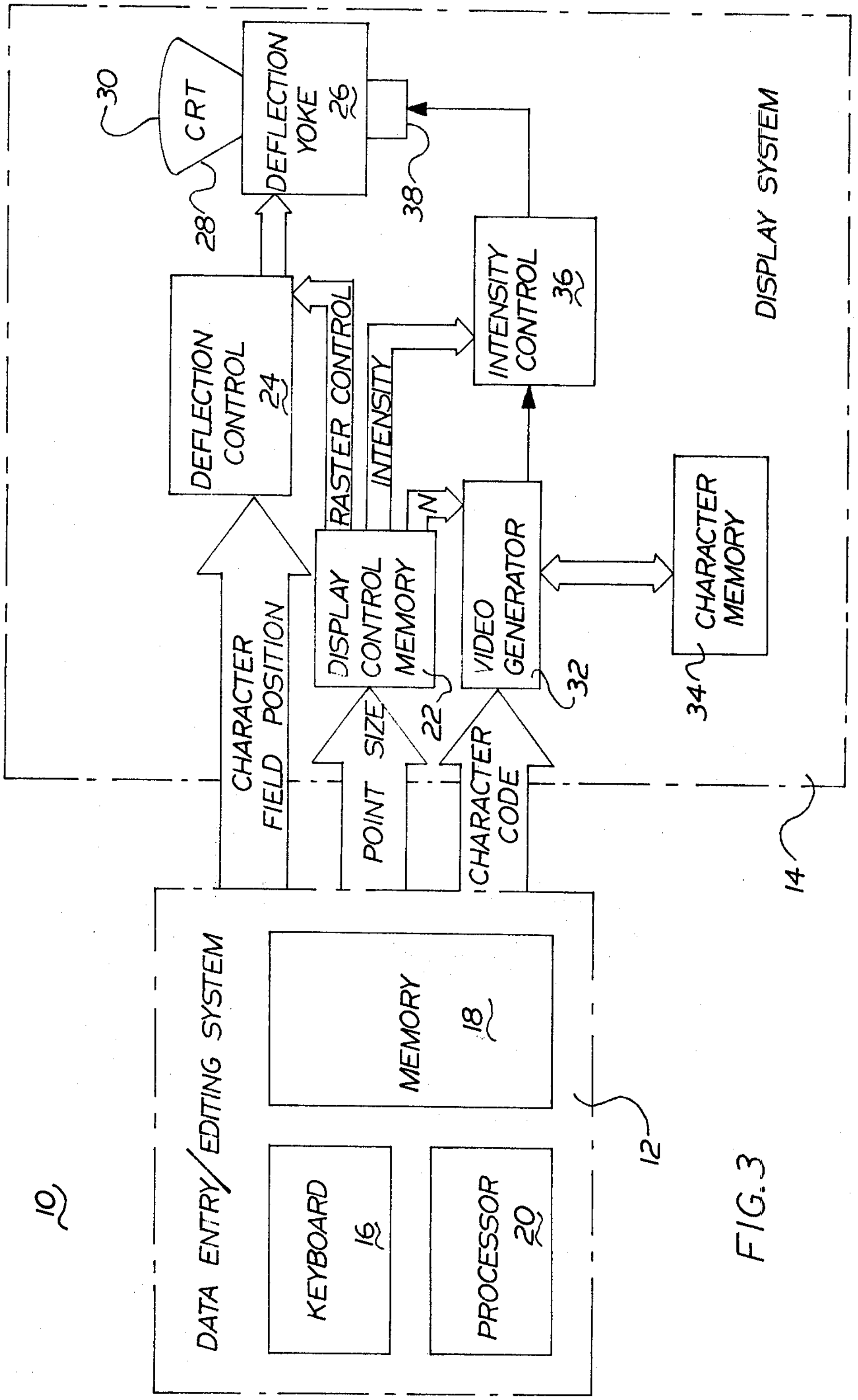
FIG. 3 is a general block diagram of a system incorporating the repeat stroking feature of the present invention.

There is illustrated in FIG. 3 on a block diagram of a system 10 incorporating the multiple-stroking feature of the present invention. The system 10 broadly includes a data entry and editing system 12 and a display system 14.

The data entry/editing system 12 as shown in FIG. 3 as including a keyboard 16 for entering data into the system and for editing the data thus entered. Memory 18 stores the data in a format convenient for display of the characters in a diddle raster scanning technique, and processor 20 controls the operation of the system.

The data outputted to display system 14 includes character field position data indicating the position of the character field in which a character is to be displayed, point size data indicating the size of the character which is to be displayed, and character codes indicating which character is to be displayed at the designated position, and in the designated size.

Within display system 14, the point size information is directed to a display control memory 22. Display control memory 22 will preferably be a read only memory (ROM) having digital words stored at addressable locations therein, with the address of each location corresponding to a particular point size. This memory represents essentially a "look-up table", and is addressed by the point size data. The digital words stored in memory 22 each include three types of information.

One portion of the word accessed by the point size data represents control information for controlling the size of the raster which will be scanned in order to display the character. This raster control information is directed to the deflection control circuit 24 along with the character field position data supplied by data entry/editing system 12. Deflection control circuit 24 provides appropriate deflection control signals to a deflection yoke 26 associated with the CRT 28 in order to deflect the electron beam to the appropriate position on the screen 30 of the CRT, and to then initiate diddle raster scanning of the character field to display the particular character at that position.

The second portion of the word accessed from display control memory 22 by the point size data is a number N which indicates to a video generator 32 the number of times that the information defining each stroke of a character is to be used to generate display strokes, i.e., the number of times each stroke of a character is to be repeated. Video generator 32 responds to this number N, and to the various character codes supplied to it periodically from the data entry/editing system 12 to generate a video signal. The video generator 32 fetches the 12 bits of pixel information representing each stroke of the character being displayed from a character memory 34. This information is then converted into serial form, and is transmitted to the intensity input 38 of CRT 28 through the intensity control circuit 36.

The third portion of the word accessed by the point size data is intensity information which is used by the intensity control circuit 36 to control the intensity of the video signal which is supplied by the video generator circuit 32. This intensity control signal sets the intensity of the video signal at a level selected to compensate for the apparent change in the brightness of the signal with varying point sizes.

More specifically, the intensity information is such that the amplitude of the video signal will be greater for characters of point size 24 than it will be for characters of point size 25. By decreasing the intensity of the video signal, the actual intensity of each display stroke of the characters of point size 25 will diminish, thereby effectively compensating for the apparent increase in brightness due to the doubling of the number of strokes in each character.

As was mentioned previously, the raster control information supplied to deflection control circuit 24 from display control memory 22 is interrelated with the value of N, the number of times each stroke is to be repeated, such that the rate at which the electron beam moves in the X direction will be reduced whenever N is increased. Thus, for example, point sizes above point size 48 will have an N factor of 3. Each stroke of the character will therefore be repeated three time, and the rate at which the electron beam travels in the X direction will be reduced by a factor of 3 so that these strokes can be displayed in the same character field as they would have been in the past.

Figure 4:
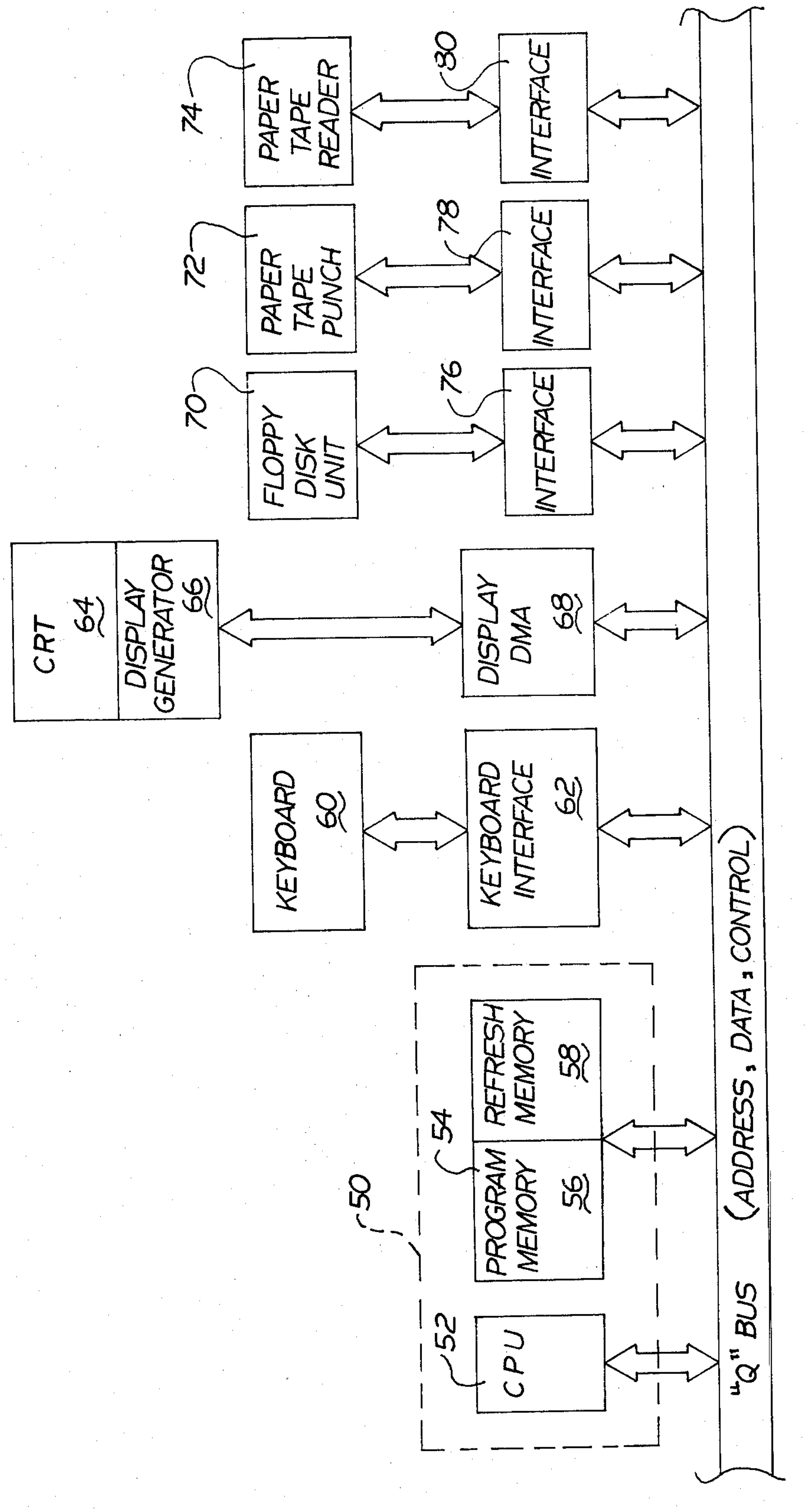
FIG. 4 is a block diagram of a specific system employing the present invention.

FIG. 4 is a block diagram of a specific system employing the present invention. In this figure, a number of devices are connected to a single address/data/control bus identified in the drawing as the "Q" bus. A microcomputer 50 (which may, for example, be an LSI 11 microcomputer, manufactured by Digital Equipment Corporation) controls the operation of the system, and generally includes a central processing unit (CPU) 52 and a memory 54 which includes a program memory section 56 and a refresh memory section 58. The program memory section 56 stores all of the software for controlling the operation of the system, whereas the refresh memory 58 stores the data which is being operated upon and which is being displayed on a display device. A keyboard 60 is interfaced with the Q bus through a keyboard interface 62, and provides a means for entering data into the refresh memory, and for editing the information which is already stored there.

The information in refresh memory 58, as entered and editted through keyboard 60, is continuously displayed on a cathode ray tube 64. The information in the refresh memory 58 is continuously outputted to a display generator 66 from a direct memory access circuit (DMA) 68. DMA 68 operates to directly and sequentially access the information stored in refresh memory 58, and to supply this information to display generator 66. The speed of this operation is such that the entire bulk of the information displayed on the screen of the CRT is updated sixty times per second. The editing of the information of the refresh memory 58 through keyboard 60 will be interspersed throughout this displaying process, which takes place continously.

Other peripheral devices may also be connected to the Q bus, such as a floppy disc unit 70, a paper tape punch unit 72, and a paper tape reader 74. These devices will be interfaced with the Q bus through appropriate interface circuits 76, 78, and 80.

The manner in which these elements cooperate to enter data into refresh memory 58 is well known in the art, and forms no part of the present invention, per se. In order to simplify the description, then, these elements will not be described in detail. For present purposes it will suffice to describe the format in which this information is stored in refresh memory 58.

Information stored in refresh memory 58 is preferably stored in a "line block" format, as generally described in the aforementioned patent to Frederickson. Each line block contains information corresponding to an arbitrary number of characters selected by the operator. Data is arrayed in this format in order to simplify editing operations. By accessing a particular line block, the operator is able to effect a change over an entire sequence of characters, without the necessity of changing the data associated with each character position.

Figure 5:
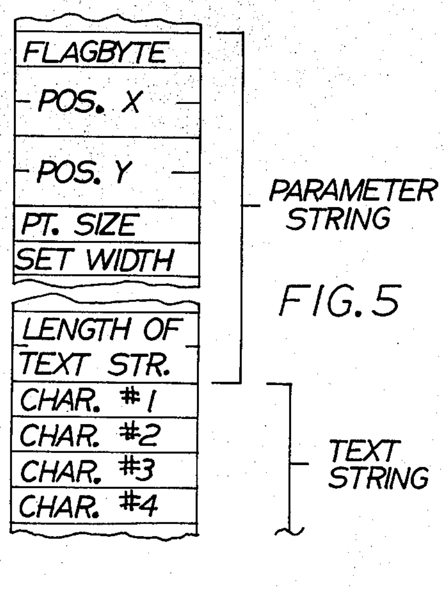
FIG. 5 is a representation of the format in which data is stored in the refresh memory of the system of FIG. 4.

The data format is shown more specifically in FIG. 5, In this figure, refresh memory 58 is characterized as a continuous string of memory locations, each memory location containing a specific byte of data therein. Each string of memory locations corresponding to a single line block is separated into a "parameter string" which represents a fixed number of the first sequential words in the line block, and a "text string" which may be of arbitrary length, and which includes the character codes which are to be displayed in that line block. The text string may also have various control and set up commands interspersed among the character codes.

The parameter string includes the information necessary to set up the display generator 66 to display that line block. This parameter area includes X POS and Y POS words which identify the area to which the electron beam is to move on the face of CRT 64 before painting the first character in the line block, and also includes such additional information as point size and set width to identify the size of the characters which are to be displayed. Also included in this parameter string is a two byte word which defines the length of the text portion which is to follow.

In order to conserve memory, the functions of the particular elements of the parameter string are identified by their position within the parameter string, rather than by added identification tags embedded therein. Display DMA 68 identifies these parameters by their position, and then adds an identification tag comprised of a four bit word immediately prior to each of the parameters in the string. Each character will likewise receive a tag identifying them as such. The parameters and text, thus modified to include identification tags, are serially transmitted to the display generator 36 which, in the system being described, is located remote from the refresh memory 58 and display DMA 68.

Figure 6:
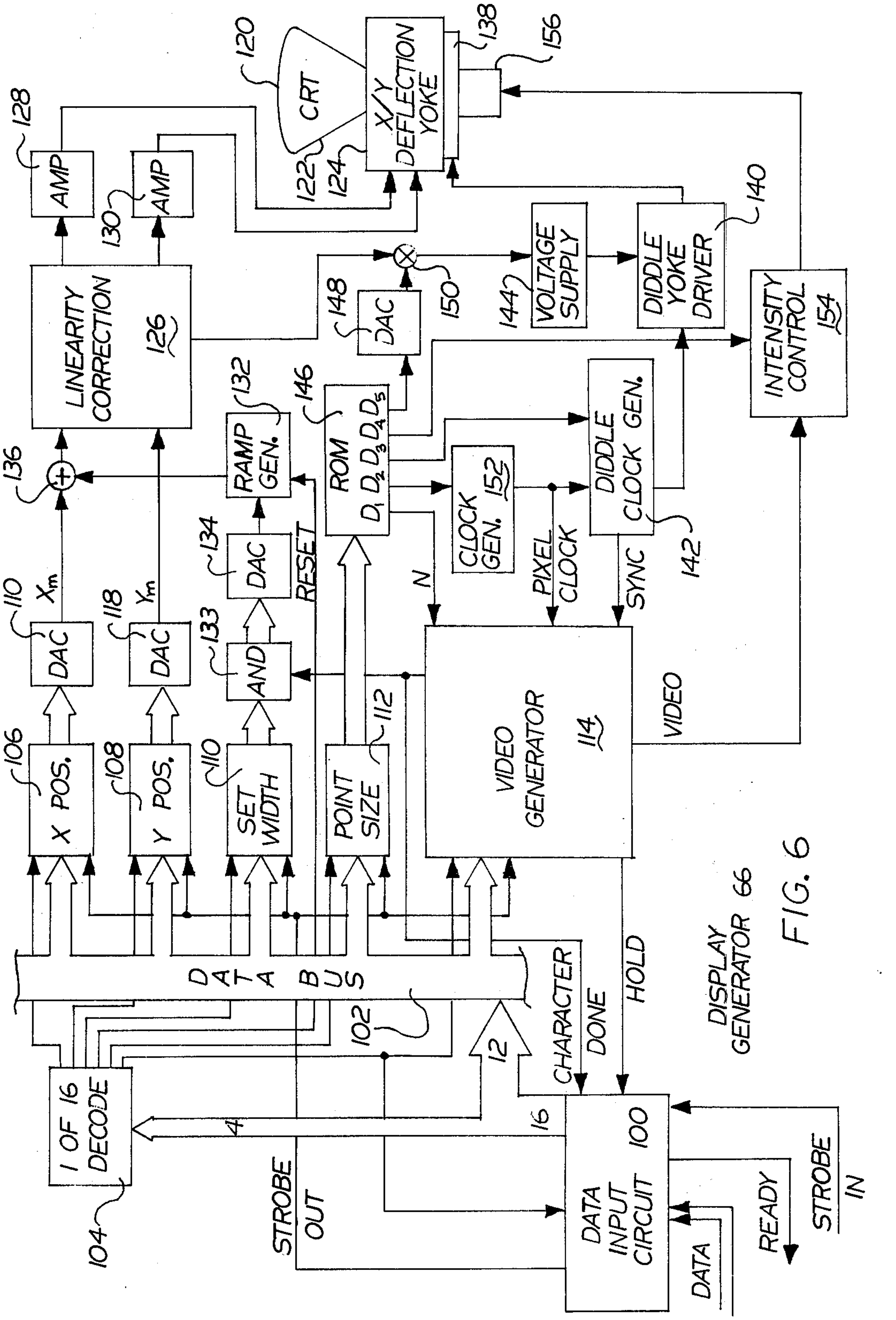
FIG. 6 is a more detailed block diagram of the display generator of the system shown in FIG. 4.

FIG. 6 is a more specific block diagram of the display generator 66 of FIG. 4. Display generator 66 includes a data input circuit 100 which receives the data two bits at a time from DMA 68. The transfer of data between the data input circuit 100 and the display DMA 68 is controlled by several control lines. The data input circuit 100 sends a READY signal to the display DMA indicating that it is prepared to accept input data. The display DMA then places two bits of data on the data input lines to data input circuit 100, and applies a pulse signal to the STROBE input. This pulse latches the data in the data input circuit. In this fashion, data input circuit 100 builds up 16 bit words comprised of 12 bits of data and 4 bits of identification tab. The 16 bit words are loaded into a 64 word FIFO data register contained within data input circuit 100. Data is fed into this FIFO register from the display DMA, and the words stored therein are sequentially outputted to a data bus 102.

The 4 bits corresponding to the identification tag of each 16 bit word are directed to a one-of-sixteen decoder 104 which determines from these four bits which of 16 types of information is encoded in the remaining 12 bits associated with the 4 bit identification tag. Depending upon the number encoded in the identification tag, decoder 104 will place an enable signal upon one of a number of output lines. Registers 106, 108, 110 and 112, as well as video generator 114 are each connected to the data bus 102, and each responds to a corresponding one of these register enable lines.

When a word is present on the data bus which must be transferred to an appropriate register, the data input circuit 100 provides a pulse on a STROBE output which is connected in common to the load control inputs of each pf the register 106 through 12 and to video generator 114. This data strobe signal causes the register which has been enabled by the appropriate output of decoder 104 to latch therein the information then contained upon the data bus. In this fashion, information is loaded into the appropriate registers as it is presented upon the data output bus 102 of data input circuit 100.

Data input circuit 100 includes circuitry for delaying the occurrence of a strobe pulse under certain circumstances. If, for example, the data on the data bus represents a character code, then this data must be loaded into video generator 114. Video generator 114 can only hold a limited number of character codes at any one time, however. When video generator 114 is unable to accept further character codes, a HOLD line is raised to a high logic level. This signal causes data input circuit 100 to delay the strobe pulse until after the HOLD line once again drops low, indicating that video generator 114 is prepared to accept that new character code present on data bus 102.

The time of occurrence of the strobe pulse must also be selected to prevent changing display parameters during the actual painting of a character on the screen. To this end, video generator 114 provides a CHARACTER DONE signal to indicate when it is in the process of displaying a character. If the data on data bus 102 is a set up parameter (i.e., not a character code), than the strobe pulse must be delayed until after the CHARACTER DONE signal changes to a high logic level, indicating that the display of a character has been completed.

In order to allow data input circuit 100 to distinguish between these two conditions, the output of decoder 104 which controls loading of video generator 114 is also connected to input circuit 100. If this line is high (indicating that a character code is present on the data bus) than input circuit 100 monitors the HOLD line to determine when to provide the strobe pulse. When the line is low, however, (indicating that something other than a character code is present on the data bus) input circuit monitors the CHARACTER DONE line instead.

By this operation, the information associated with the parameter string of each line block is loaded into registers 106-112 in order to set the operation of the display generator for displaying the characters associated with that line block. In particular, X position register 106 and Y position register 108 are loaded with the X and Y coordinates (X POS, Y POS) of the character field which is to be displayed. These digital signals are converted into corresponding analog signals through digital to analog convertors (DAC) 116 and 118. The output signals provided by DAC's 116 and 118 respectively correspond to the X and Y major deflection signals $X_M$ and $Y_M$, and define the position on the face 120 of CRT 122 to which the electron beam will move before initiating the raster scanning of characters. Due to pincushion distortion and other types of nonlinearities present in the system, the deflection of the electron beam on the face 120 of CRT 122 is not linearally related to the amplitude of the deflection control signals which are supplied to the X/Y deflection yoke 124. Because of this, it is necessary to utilize a linearity correction circuit 126 to correct the amplitudes of the deflection signals so that the resulting deflection of the electron beam on the face 120 of CRT 122 is, in fact, linearally related to the amplitudes of the major deflection signals. Linearity correction circuit 126 may take any conventional form. The corrected deflection signals present at the output of linearity correction circuit 126 are supplied to deflection amplifiers 128 and 130. The outputs of amplifiers 128 and 130 are respectively connected to the portions of X/Y deflection yoke 124 which produce deflection of the electron beam in the X, and Y directions.

In order to cause raster scanning of the character field upon arrival of the electron beam at the position on the face of CRT 122 identified by the major deflection signals $X_M$ and $Y_M$, minor X and Y deflection signals are generated. Scanning motion of the beam in the X direction is controlled by a ramp generator 132. Ramp generator 132 responds to an analog signal supplied by a DAC 134 which is, in turn, derived from the set width commands supplied by the set width register 110. This analog signal will control the slope of a ramp generated by ramp generator 132. The resulting ramp signal is added to the major X deflection signal $X_M$ by an adder 136 so that a composite X deflection signal is supplied to the deflection amplifier 128 by the linearity deflection circuit 126.

This ramp signal causes the electron beam to scan in the X direction across the character fields in which characters are being displayed. When characters are not being displayed (as, for example, when new set up commands are being supplied to the input registers 106 through 114) the ramp generator is placed in mode wherein the analog signal provided at the output thereof does not change. This is necessary to insure that the character fields of sequential characters will be located substantially adjacent one another upon the face 120 of CRT 122. The "hold" function is implemented by "ANDing" each of the bits of the set width word with a command generated by video generator 114. An "AND" circuit 133 is provided for this function. In order to reset the ramp generated by ramp generator 132 at the conclusion of display of a line block, or upon arrival at the boundary of the face of CRT 120, a reset command will be supplied to ramp generator 132 from the decoder 104 as a result of an identification tag associated with a word at the output of data input circuit 102.

In this system, the set width command which has been loaded into set width register 110 has already been corrected for the N factor (i.e., the number of display strokes per character stroke) through the operation of CPU 52 (FIG. 4). This function could as easily be provided by a divide-by-N circuit at the output of set width register 110, however.

Raster scanning in the Y direction is accomplished through use of a diddle yoke 138 which is included on the neck of CRT 122 in order to predeflect the electron beam prior to its arrival in the main deflection yoke 124. This diddle yoke will produce the rapid scanning of the electron beam back and forth between the upper and lower extremes of the character field in the Y direction in order to produce raster scanning of the character fields. A diddle yoke driver 140 controls the operation of the diddle yoke 138. Diddle yoke driver 140 may take any conventional form, and could, for example, have the form illustrated in the copending application of Charles White, U.S. Ser. No. 909,217, now U.S. Pat. No. 4,180,765, issued Dec. 25, 1979.

The amplitude of the raster scanning in the Y direction, and thus the point size of the character being displayed, is controlled by controlling the frequency of a diddle clock supplied by a diddle clock generator 142, and by controlling the magnitude of the supply voltage from which diddle yoke driver 140 operates. This supply voltage is derived from a controlled voltage source 144.

The information necessary to control the operation of these two factors, and thus the operation of diddle yoke driver 140, is derived from a read only memory (ROM) 144 which is addressed by the point size information contained in point size register 112. This memory corresponds to display control memory 22 of FIG. 3. The digital information appearing at the output of ROM 144 comprises five separte pieces of information.

One portion (D5) controls the operation of voltage supply 144. The digital information D5 is converted into an analog signal by DAC 148. The resulting supply voltage control signal is linearity-corrected through a multiplier 150 which multiplies the control voltage by a linearity correction voltage supplied by linearity-correction circuit 126. The resulting linearity-corrected control voltage is amplified to the appropriate power level by voltage supply 144, and is then directed to the voltage supply input of diddle yoke driver 140.

Two other portions of the digital information (D2 and D3) control the operation of pixel clock generator 152 and diddle clock generator 142. The digital signal D2 directly controls the frequency of operation of a programmable frequency generator 152 which supplies at its output a pixel clock signal whose purpose will become clearer as the disclosure is more fully made. This pixel clock signal clocks the operation of diddle clock generator 142, so that the operation of the diddle clock supplied at the output thereof will be synchronous with the pixel clock provided by clock generator 152. The time duration of a diddle clock cycle (in numbers of pixel clock cycles) is controlled by the digital signal D3.

The relationships between the pixel clock generated by programmable frequency generator 152, and the sync and diddle clock outputs of diddle clock generator 142 will be described in greater detail with reference to FIGS. 9 and 10. For now, it will suffice to say that the diddle clock generator 142 provides a video sync pulse at the beginning of each display stroke, and that the diddle clock rate is such that each display stroke will always be 12 pixel clock cycles in duration.

A fourth output (D1) of ROM 146 specifies the number of times N that each stroke of the character is to be repeated before proceeding with the display of the next stroke of the character. The fifth output (D3) of ROM 146 is connected to an intensity control circuit 154 in order to set the intensity of the video signal which is supplied to the intensity control input 156 of CRT 122. As mentioned previously, this is done so that the characters being displayed will be of substantially uniform apparent brightness, regardless of point size.

These five digital words D1–D5 control, with two exceptions, all of the functions necessary to control the size of the character displayed on the face 120 of CRT 122. The two exceptions are the Y position and set width commands. Both of these will vary with point size and, in the system being described, both will have already been modified in the necessary manner before reaching display generator 66. The manner in which the set width command is altered through the operation of CPU 52 has been described previously, and will not be repeated here. CPU 52 will also modify the Y position commands stored in refresh memory 58 by adding a baseline offset signal thereto. This is necessary because the number loaded in the Y position register 108 will control only the Y centerline of the character displayed. Thus, if characters of different point sizes are to be displayed on a common baseline, an offset signal (which will vary directly with point size) must be added to the Y position signal. This could also be accomplished by storing a baseline offset word in ROM 146 to also be addressed by the point size word, and by then adding this to the Y position signal.

Figure 11:
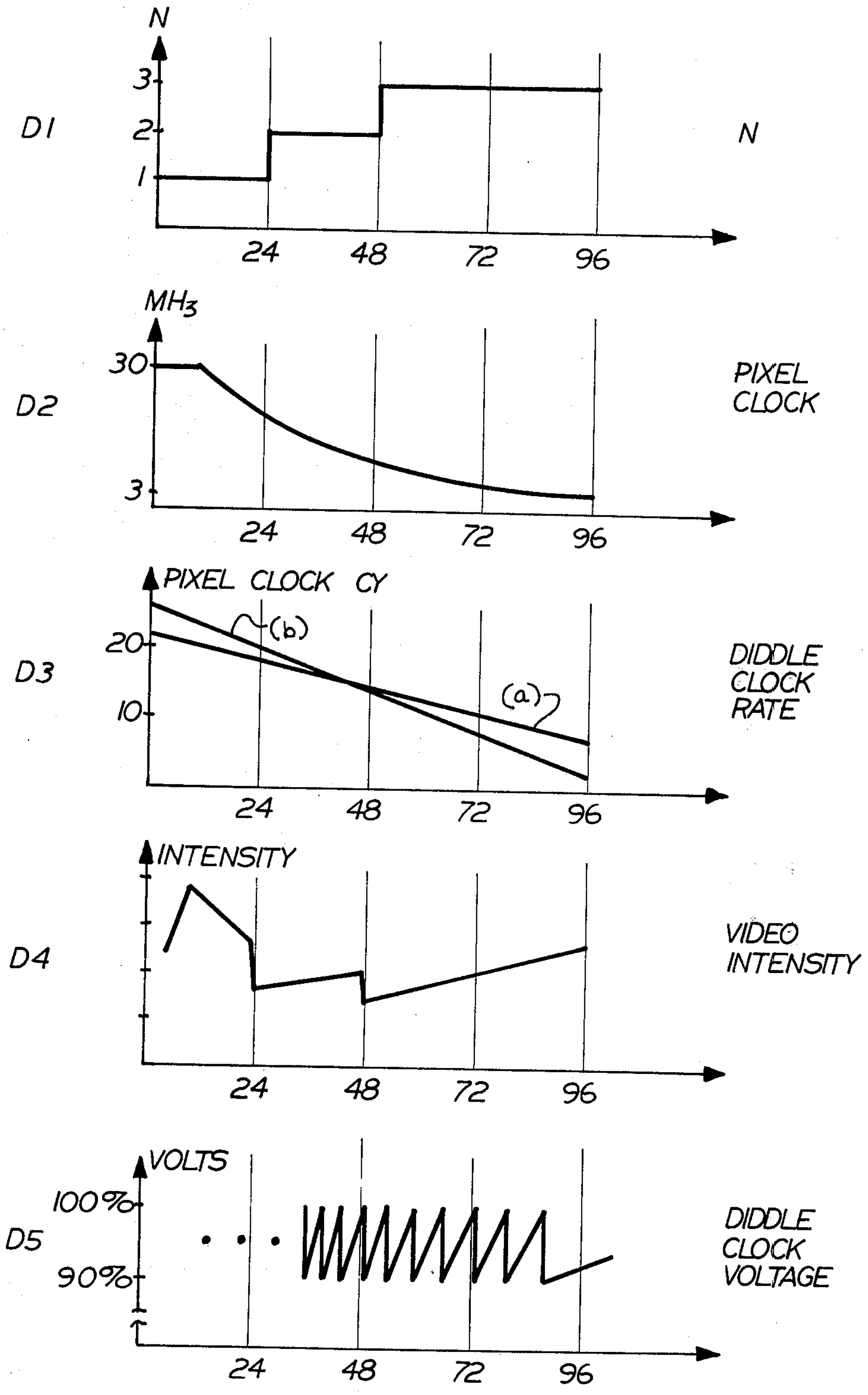
FIG. 11 is a graphical representation of the data contained on ROM 146 of FIG. 6.

The point size of the displayed character will, however, be adjusted primarily by changing the word contained in point size register 112. This will address the proper information D1-D5 to display characters of the correct size. The manner in which these signals D1-D5 vary with point size is shown graphically in FIG. 11.

Figure 8:
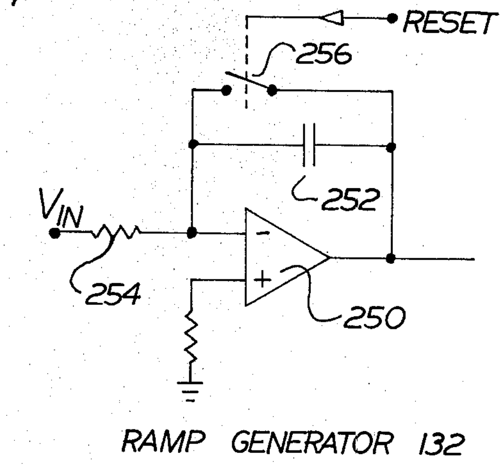
FIG. 8 is a schematic illustration of the ramp generator portion of FIG. 6.

The video signal is generated by video generator 114, which is shown in greater detail in FIG. 8. The video generator 114 generally includes a character code latch 200, an address counter 202, a character, or "font", memory 204, a parallel-to-serial convertor 206, and assorted control circuitry generally indicated at reference numeral 208.

The character code appearing on the data bus 102 (FIG. 6) are loaded into the character code latch 200 whenever one of the strobe pulses provided by data input circuit 100 is gated to the character code latch by AND gate 210. AND gate 210 will pass these pulses to the character code latch 200 only when a load enable signal derived from one of the outputs of decoder 104 (FIG. 6) is high, indicating that a character code is available on the data bus. The information thus loaded in the character code latch 200 will eventually be loaded into an address counter 202 in order to address a character memory 204.

Character memory 204 has 12 bit words stored therein, with the 12 bits of each word corresponding to the twelve pieces of pixel information which go to make up a single stroke of a character. The ten strokes associated with each character are stored in character memory 204 in sequential locations, so that the first stroke of successive characters will be separated by ten addresses of character memory 204.

The character codes utilized to identify the particular characters which are to be displayed could simply represent the address of the first stroke of that character in character memory 204. This would result in an unnecessarily lengthy character code, however, since the starting address of each character is separated by ten address positions from the next character code starting address. It is therefore preferable that the character codes represent the starting address of the character within the memory, divided by ten. In this fashion, the actual character code address can be derived simply by multiplying the character code by ten, yet waste due to unused numbers between sequential character codes is precluded. In order to derive the address of the character within character memory 204 from the character code, then, a multiply-by-ten circuit 212 is provided between the character code latch 200 and the address counter 202. The signal which is loaded into address counter 202, therefore, exactly corresponds to the address of the first stroke of the character identified by the character code which had been stored within latch 200.

This address accesses the 12 bit word containing the pixel information for the first stroke of that character from character memory 204. The 12 bit word thus addressed is loaded into parallel-to-serial convertor 206, and then shifted out as a serial bit stream at a rate determined by the pixel clock. As stated previously, this pixel clock will be tied in with the speed of the diddle clock so that the 12 pixels of the stroke are evenly distributed along a single vertical display stroke. As the pixel bits are shifted out of parallel-to-serial convertor 206, zeros are loaded into the serial input thereof. Consequently, the video output will remain low after all 12 pixels bits have been shifted out, unless a new word is loaded into convertor 206 from character memory 204.

The appropriate control and timing signals for establishing this mode of operation are provided by the control circuitry 208. This circuitry responds to a video sync signal derived from the diddle clock generator 142. As stated previously, this sync signal comprises a train of pulses, with each pulse identifying the initiation of a new display stroke. This signal controls the loading of parallel-to-serial convertor 206 through an AND gate 214, which disables the loading of a new character stroke into convertor 206 whenever the display of the previous character has been completed, unless a new character code has been received. Consequently, if no new character code is received, convertor 206 will not be loaded with new pixel information and the video signal will remain at a low, or "off" level.

The sync signal is also supplied to a divide-by-N counter 216 to which the number N from output D1 of ROM 146 (FIG. 6) is also directed. Circuit 216 will provide one output pulse for each N sync pulses received at its input. The output of divide-by-N counter 216 is directed to the "count" input of address counter 202, and also to the "count" input of the decade counter 218. Because of the connection between divide-by-N circuit 216 and counter 202, the address in address counter 202 will be incremented each N sync pulses. The parallel-to-serial convertor 206 will therefore be loaded N times with the same stroke information supplied by character memory 204, before the address counter 202 is incremented to address the next character stroke. Consequently, the display of each character stroke is repeated N times.

Decade counter 218 controls the reloading of address counter 202 with the address of a new character when all ten character strokes of the previous character have been displayed. Upon counting to ten (indicating that the address counter has been incremented ten times), the output of decade counter 218 will shift to a high logic level, and will remain there until reset. An AND gate 220 prevents the loading of address counter 202 unless character code latch 200 has previously been loaded with the new character code. A set/reset flip-flop 222 provides an output signal indicative of this. This flip-flop will be set whenever character code latch 200 is loaded, and will be reset whenever address counter 202 is loaded. If character code latch 202 has been loaded with a new address code, then the Q output of flip flop 222 will be high. When the output of decade counter 218 shifts to a high logic level, then the result will be a high logic level at the output of AND gate 220. After a delay introduced by delay circuit 224, this signal will produce the loading of address counter 202, the resetting of flip flop 222, and the resetting of decade counter 218.

The output of decade counter 218 is also directed to AND gate 214 through an invertor 226. The output signal of invertor 226 will be high only when a character is being displayed (i.e., when the address counter 202 has been incremented fewer than ten times). Consequently, when a full character has been displayed but no new address has been loaded into address counter 202 the output of invertor 226 will remain at a low logic level. AND gate 214 will therefore disable the sync signals from reloading convertor 206.

Figure 7:
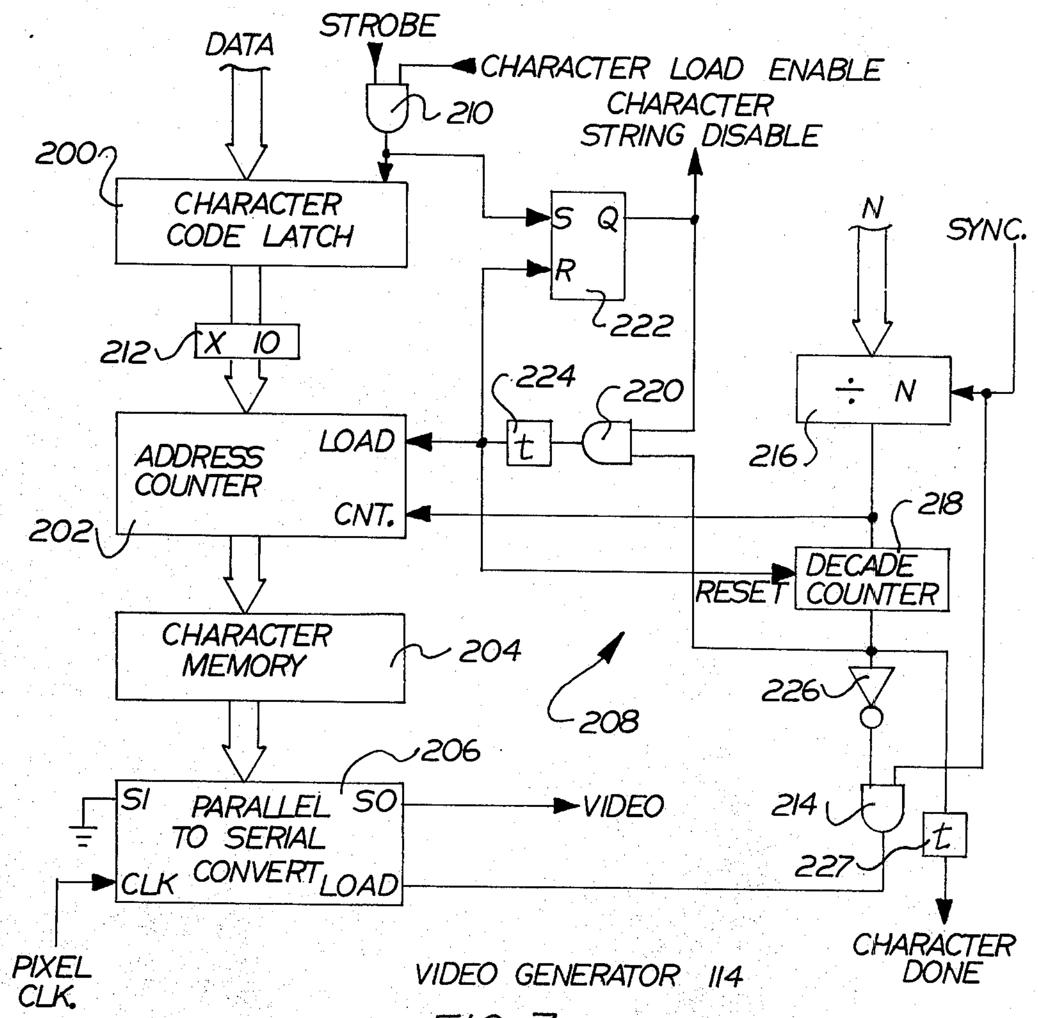
FIG. 7 is a more detailed block diagram of the video generator portion of FIG. 6.

The video generator 114 shown in FIG. 7 provides several output signals to other places in the display generator 66, as illustrated in FIG. 6. The output of decade counter 218 is connected to the CHARACTER DONE input of data input circuit 100 through a suitable delay circuit 227. As stated previously, this signal inhibits the updating of display parameters during the painting of a character on the screen. In the event that the next signal on data bus 102 is not a character (i.e., is a display parameter) then the strobe output signal of data input circuit 100 will be disabled until the completion of the character being displayed. The strobe signal will thus be generated only upon the completion of display of the particular character.

This signal from delay circuit 227 is also directed to AND circuit 133 in order to prevent the ramp generator from increasing the magnitude of the ramp during those intervals in which a character is not being displayed. This is done in order to insure that sequential characters will be displayed in adjacent character fields on the screen.

Another control signal derived from video generator 114 represents the HOLD input of data input circuit 100. This signal, taken from the output of flip-flop 222, indicates to data input circuit 100 that the character code latch 200 already contains a new character to be displayed, and cannot hold any further characters. In the event that a character is present on data bus 102, then, the strobe output of data input circuit 100 will be disabled until the hold signal indicates that the contents of the character code latch 200 have been loaded into address counter 202, so that character code latch 200 is once again available to receive a new character code.

The ramp generator circuit 132 (FIG. 6) is shown in schematic form in FIG. 8. This ramp generator circuit is of conventional design and generally includes an operational amplifier 250 having a capacitor 252 connected from the output to the negative input thereof. The desired ramping signal is generated simply by applying a constant voltage level to the voltage input $V_{IN}$. The slope of this ramp signal will be dependent upon the magnitude of the voltage $V_{IN}$, derived from DAC 134. This circuit also includes an analog switch 256 which is responsive to the reset signal supplied by one-of-sixteen decoder 104. Analog switch 256, which is connected across capacitor 252, is normally open so that a charge is permitted to build up on capacitor 252. When a reset signal is provided thereto, however, analog switch 256 will close, thus completely dissipating the charge stored on capacitor 252 and resetting the ramp.

Figure 9:
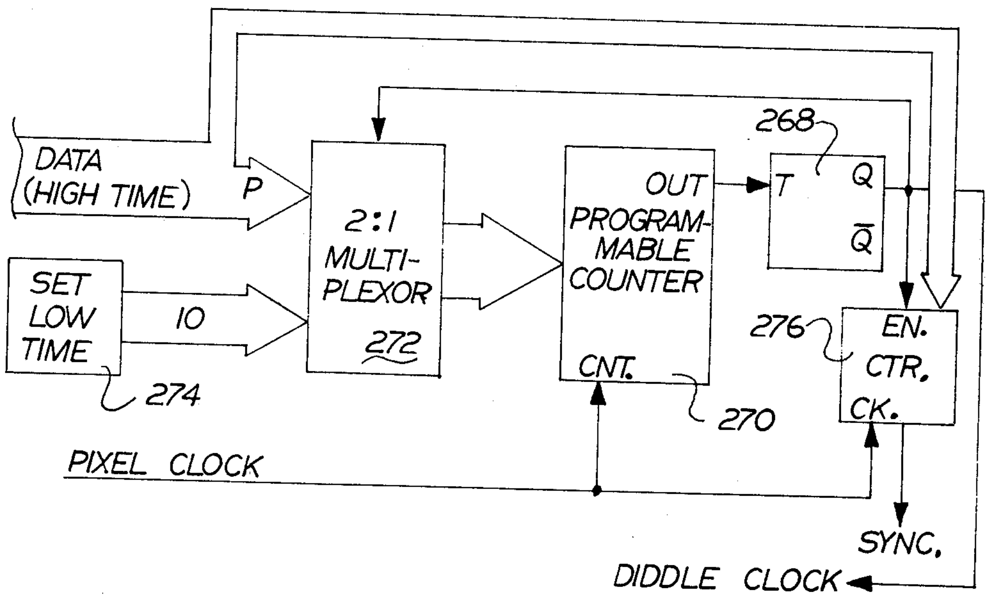
FIG. 9 is a block diagram of the diddle clock generator portion of FIG. 6.

FIG. 9 provides a more detailed illustration of the diddle clock generator 142 of FIG. 6. This diddle clock generator includes a toggle flip-flop 268 which provides the diddle clock output signal. This toggle flip-flop is clocked whenever a programmable counter 270 overflows. The count input of programmable counter 270 is derived from the pixel clock provided by clock generator 152 (FIG. 6).

The number of pixel clock cycles required to produce an overflow from programmable counter 270 is determined by a digital word inputted to programmable counter 270 from a 2-to-1 multiplexer 272. 2-to-1 multiplexer 272 will provide one of two digital words to programmable counter 270, dependent upon the state of toggle flip-flop 268. When the output of toggle flip-flop 268 is in at a low logic level, then the input to programmable counter 270 from multiplexer 272 will be a fixed digital word, supplied from a "set low time" circuit 274. In the figure, this digital number is set at ten, so that programmable counter 270 will count ten pulses of the pixel clock before overflowing. Upon this occurring, the output of toggle flip-flop 268 will shift from a low to a high logic level, causing 2-to-1 multiplexer 272 to instead connect a portion of the D3 output of ROM 146 (i.e., D3*a*), (FIG. 6) to the program input of programmable counter 270. This number will control the number of pixel clock cycles for which toggle flip-flop 268 remains in the high state.

Figure 10:
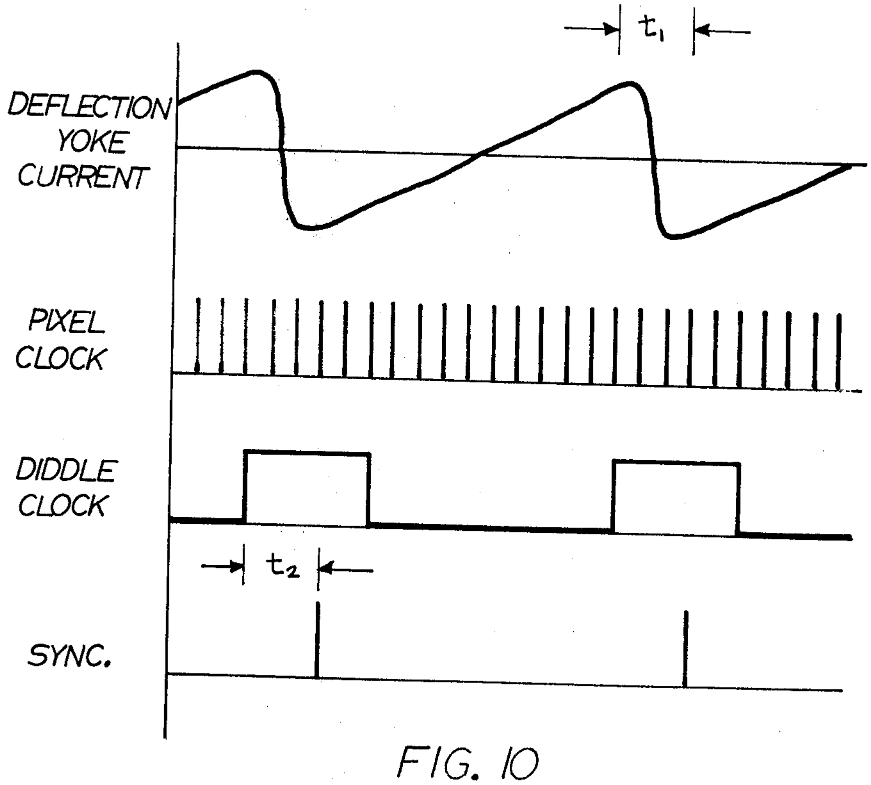
FIG. 10 is a timing diagram useful in understanding the operation of the circuit of FIG. 9.

This may be more readily understood with reference to FIG. 10, which includes timing diagrams representative of a particular pixel clock rate. In this figure, the diddle clock is low for ten clock cycles, due to the operation of a "set low time" circuit 274. The programmed "high" time of the diddle clock, however, is set in this example at five pixel clock cycles. The number of pixel clock cycles which are required to trigger flip-flop 268 to a low state must vary with point size, since the retrace time ($T_1$) will be essentially constant, regardless of the low time of the diddle clock.

As stated previously, diddle clock generator 142 also provides a video sync output signal to video generator 114 to indicates that a new display stroke has been initiated. This sync signal must occur at the beginning of the linear portion of the current ramp through diddle deflection yoke 138, and will always occur a fixed time interval $T_2$ following the rising edge of the diddle clock since the retrace time $T_1$ of the diddle deflection yoke is substantially constant. The number of pixel clock cycles in this interval will vary, however, due to the variable rate of the pixel clock. Diddle clock generator 142 thus includes a second programmable counter circuit 276. A program input to this circuit is also derived from a portion of the D3 output of ROM 146 (i.e., D3*b*). This input signal indicates the number of pixel clock cycles which must occur between the rising edge of the diddle clock and the sync pulse. The counter is clocked from the pixel clock supplied by clock generator 152 and is reset by the rising edge of the diddle clock signal so that only those pulses following that rising edge will be counted.

Apparatus has thus been described which accomplishes the display of characters of variable size. In order to retain the form of the character being displayed as the size is increased, each character stroke is repeated a selected number of times. For point sizes up to and including a point size of 24, each character stroke is used to generate only a single display stroke. For point sizes above point size 24, up to and including point size 48, each of the character strokes is repeated twice so that twice as many display strokes as character strokes exist. For point sizes above point size 48, each character stroke is repeated three times so that the number of display strokes will be three times as great as the number of character strokes. The particular point sizes at which these transitions occur, and the number of strokes associated with each point size is largely arbitrary, however, and does not represent a limitation of the present invention. In addition, of course, the apparatus which may be utilized to carry the invention into practice is in no way limited to the specific apparatus disclosed herein.

Therefore, although the invention has been described with respect to a preferred embodiment, it will be appreciated that any number of alterations and rearrangements of parts may be made without departing from the spirit and scope of the invention, as defined in the following claims.

What is claimed is:

1. Apparatus for controlling an energy beam to paint a plurality of variable size characters on an energy responsive surface one at a time, comprising:

raster scanning means for causing the energy beam to separately raster scan each of the portions of the energy responsive display surface upon which the individual characters are to be displayed by scanning a plurality of adjacent display strokes in each portion, with the raster scan of each portion being completed before scanning of the next portion has begun;

raster control means responsive to raster control signals to vary the length of and separation between said display strokes;

means responsive to a video signal for controlling the intensity of said energy beam as said beam raster scans each of said portions of said display surface so as to thereby display said characters on the respective said portions of said surface;

means for providing information representing the individual strokes to be displayed to generate selected characters;

video signal generating means for generating a video signal from said individual stroke information in synchronism with the raster scanning, and including means for repeating the information of each of said individual strokes a selected number of times N in said video signal so that said information for each of said individual strokes is displayed in a selected number N of adjacent display strokes on said portion of said display surface;

means for providing an indication of the size of said image to be displayed; and means responsive to said indication for providing said raster control signals and said selected number N in accordance therewith.

2. Apparatus as set forth in claim 1, and further comprising means for setting the intensity of said video signal in accordance with said indication such that said images displayed by said apparatus have a substantially uniform apparent brightness independently of the size of the displayed image.

3. Apparatus as set forth in claims 1 or 3, wherein said means for providing information representing the individual strokes to be displayed to generate a selected image comprises character memory means having a plurality of words stored therein, each of said words representing pixel information for generating a single stroke of one of a plurality of characters, and means for addressing said memory with character codes indicating which of said plurality of characters is to be displayed so as to recover from said memory the words corresponding to the character strokes thereof.

4. Apparatus as set forth in claim 3, wherein said video signal generating means comprises means for utilizing each of said words of pixel information to generate the video signals for a plurality of adjacent display strokes whereby each of said character strokes is used to generate a number N of adjacent display strokes.

5. Apparatus as set forth in claim 1, wherein said selected number N increases with increases in the size of said image to be displayed.

6. Apparatus as set forth in claim 1, and further comprising means for causing said raster scanning to occur at selected different places on said display surface whereby a plurality of images of differing sizes may be displayed on said display surface.

7. A method of displaying variable size characters in a system in which the characters are painted on an energy responsive surface one at a time by causing an energy beam to raster scan only the minor portion of the display surface in which that character is to be displayed, comprising the steps of:

selecting the size of a character to be displayed;

providing information for controlling the intensity of said energy beam during individual strokes in the minor raster scan to provide a pattern of character strokes on the display surface which collectively represents said character; and utilizing that information to display a character of the selected size by selecting an integer N related to said selected size, using the information corresponding to each character stroke to control the intensity of the energy beam during N adjacent strokes in the raster scan and setting the size of the minor raster being scanned so that the resulting character has the selected size.

8. The method of claim 7, wherein the step of utilizing the information includes the step of selecting the number N of adjacent strokes in the minor raster scan in which the information for each character stroke is to be repeated, with N having at least first and second values, said first value being selected for character sizes between first and second limits, and said second value being selected for character sizes between said second limit and a third limit, said character size variations between said first and second, and second and third limits being accomplished by varying the size of the minor raster being scanned, without changing N.

* * * * *

UNITED STATES PATENT AND TRADEMARK OFFICE

CERTIFICATE OF CORRECTION

PATENT NO. : 4,241,340

DATED : December 23, 1980

INVENTOR(S) : Meredith T. Raney, Jr.

It is certified that error appears in the above-identified patent and that said Letters Patent are hereby corrected as shown below:

Column 14, line 60, change "3" to --2--(second occurrence).

Signed and Sealed this

*Twenty-eighth* Day of *April 1981*

[SEAL]

*Attest:*

RENE D. TEGTMEYER

*Attesting Officer* *Acting Commissioner of Patents and Trademarks*